(12) United States Patent
Trim et al.

(10) Patent No.: US 10,943,580 B2
(45) Date of Patent: Mar. 9, 2021

(54) PHONOLOGICAL CLUSTERING

(71) Applicant: INTERNATIONAL BUSINESS MACHINES CORPORATION, Armonk, NY (US)

(72) Inventors: Craig M. Trim, Sylmar, CA (US); John M. Ganci, Jr., Cary, NC (US); James E. Bostick, Cedar Park, TX (US); Carlos A. Fonseca, LaGrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 143 days.

(21) Appl. No.: 15/977,507

(22) Filed: May 11, 2018

(65) Prior Publication Data

US 2019/0348021 A1    Nov. 14, 2019

(51) Int. Cl.
| | | |
|---|---|---|
| *G10L 15/06* | (2013.01) | |
| *G10L 15/02* | (2006.01) | |
| *G10L 13/02* | (2013.01) | |
| *G06N 3/08* | (2006.01) | |
| *G06K 9/62* | (2006.01) | |

(Continued)

(52) U.S. Cl.
CPC .......... *G10L 15/063* (2013.01); *G06F 40/284* (2020.01); *G06K 9/6218* (2013.01); *G06K 9/6256* (2013.01); *G06N 3/08* (2013.01); *G10L 13/02* (2013.01); *G10L 13/08* (2013.01);
(Continued)

(58) Field of Classification Search
CPC ....... G10L 15/063; G10L 13/02; G10L 13/08; G10L 15/02; G10L 2015/025; G10L 2015/0631; G06F 40/284; G06K 9/6218; G06K 9/6256; G06N 3/08
See application file for complete search history.

(56) References Cited

U.S. PATENT DOCUMENTS

| | | | | |
|---|---|---|---|---|
| 4,624,010 A | * | 11/1986 | Takebayashi | .......... G10L 15/00 704/239 |
| 5,692,097 A | * | 11/1997 | Yamada | .................. G10L 15/12 704/231 |

(Continued)

OTHER PUBLICATIONS

K Chen, M Hasegawa-Johnson—"Modeling pronunciation variation using artificial neural networks for English spontaneous speech," 8th International Conference on Spoken Language Processing, ICSLP 2004—isca-speech.org, 2004.*

(Continued)

*Primary Examiner* — Fariba Sirjani
(74) *Attorney, Agent, or Firm* — Scott Dobson; Andrew D. Wright; Roberts Calderon Safran & Cole, P.C.

(57) ABSTRACT

Methods and systems for phonological clustering are disclosed. A method includes: segmenting, by a computing device, a sentence into a plurality of tokens; determining, by the computing device, a plurality of phoneme variants corresponding to the plurality of tokens; clustering, by the computing device, the plurality of phoneme variants; creating, by the computing device, an initial vectorization of the plurality of phoneme variants based on the clustering; embedding, by the computing device, the initial vectorization of the plurality of phoneme variants into a deep learning model; and determining, by the computing device, a radial set of phoneme variants using the deep learning model.

20 Claims, 5 Drawing Sheets

(51) Int. Cl.
  *G10L 13/08* (2013.01)
  *G06F 40/284* (2020.01)
(52) U.S. Cl.
  CPC ........ *G10L 15/02* (2013.01); *G10L 2015/025* (2013.01); *G10L 2015/0631* (2013.01)

(56) References Cited

U.S. PATENT DOCUMENTS

| | | | | |
|---|---|---|---|---|
| 5,749,066 | A * | 5/1998 | Nussbaum | G10L 15/063 |
| | | | | 704/232 |
| 6,163,769 | A * | 12/2000 | Acero | G10L 13/07 |
| | | | | 704/243 |
| 6,236,965 | B1 * | 5/2001 | Kim | G10L 15/06 |
| | | | | 704/232 |
| 6,510,410 | B1 * | 1/2003 | Chen | G10L 15/02 |
| | | | | 704/207 |
| 6,711,541 | B1 * | 3/2004 | Kuhn | G10L 15/063 |
| | | | | 704/242 |
| 7,165,032 | B2 * | 1/2007 | Bellegarda | G10L 15/063 |
| | | | | 704/258 |
| 7,302,389 | B2 | 11/2007 | Gupta et al. | |
| 8,301,447 | B2 * | 10/2012 | Yoakum | G10L 15/187 |
| | | | | 704/254 |
| 8,380,506 | B2 | 2/2013 | Jeon et al. | |
| 8,527,276 | B1 * | 9/2013 | Senior | G06N 3/084 |
| | | | | 704/259 |
| 8,744,856 | B1 | 6/2014 | Ravishankar | |
| 8,775,341 | B1 * | 7/2014 | Commons | G10L 15/16 |
| | | | | 706/20 |
| 8,972,243 | B1 * | 3/2015 | Strom | G10L 15/193 |
| | | | | 704/1 |
| 9,153,231 | B1 * | 10/2015 | Salvador | G10L 15/065 |
| 9,224,386 | B1 * | 12/2015 | Weber | G10L 15/06 |
| 9,818,409 | B2 * | 11/2017 | Senior | G10L 15/02 |
| 10,460,256 | B2 * | 10/2019 | Amershi | G06T 11/206 |
| 2002/0040296 | A1 * | 4/2002 | Kienappel | G10L 15/02 |
| | | | | 704/220 |
| 2002/0087313 | A1 * | 7/2002 | Lee | G06Q 30/06 |
| | | | | 704/254 |
| 2003/0110035 | A1 * | 6/2003 | Thong | G10L 15/083 |
| | | | | 704/254 |
| 2003/0110038 | A1 * | 6/2003 | Sharma | G06K 9/00221 |
| | | | | 704/270 |
| 2003/0120482 | A1 * | 6/2003 | Tian | G10L 15/12 |
| | | | | 704/209 |
| 2005/0010412 | A1 * | 1/2005 | Aronowitz | G10L 15/02 |
| | | | | 704/254 |
| 2005/0119890 | A1 * | 6/2005 | Hirose | G10L 13/08 |
| | | | | 704/260 |
| 2006/0009978 | A1 * | 1/2006 | Ma | 704/266 |
| 2006/0212296 | A1 * | 9/2006 | Espy-Wilson | G10L 15/02 |
| | | | | 704/254 |
| 2009/0248395 | A1 * | 10/2009 | Alewine | G10L 13/08 |
| | | | | 704/7 |
| 2010/0057452 | A1 * | 3/2010 | Mukerjee | G10L 15/02 |
| | | | | 704/232 |
| 2010/0280827 | A1 * | 11/2010 | Mukerjee | G10L 15/142 |
| | | | | 704/236 |
| 2011/0004475 | A1 * | 1/2011 | Bellegarda | G10L 15/08 |
| | | | | 704/251 |
| 2011/0184723 | A1 * | 7/2011 | Huang | G06F 40/205 |
| | | | | 704/8 |
| 2014/0236600 | A1 * | 8/2014 | Lu | G10L 15/063 |
| | | | | 704/251 |
| 2015/0255069 | A1 * | 9/2015 | Adams | G10L 15/08 |
| | | | | 704/236 |
| 2016/0062979 | A1 * | 3/2016 | Mote | G06F 40/30 |
| | | | | 704/9 |
| 2016/0351188 | A1 * | 12/2016 | Rao | G10L 15/187 |
| 2017/0178623 | A1 * | 6/2017 | Shamir | G10L 15/18 |
| 2017/0263249 | A1 | 9/2017 | Akbacak et al. | |
| 2018/0067558 | A1 * | 3/2018 | Eagleman | G09B 21/04 |
| 2018/0137880 | A1 * | 5/2018 | Wenndt | G06F 21/32 |
| 2018/0330719 | A1 * | 11/2018 | Fridental | G10L 15/063 |
| 2018/0336880 | A1 * | 11/2018 | Arik | G10L 15/063 |

OTHER PUBLICATIONS

Broomhead, David H.; Lowe, David (1988). "Multivariable Functional Interpolation and Adaptive Networks" (PDF). Complex Systems. 2: 321-355. Archived from the original (PDF) on Jul. 14, 2014. 2014.*

Sun et al., "An Overlapping-Feature Based Phonological Model Incorporating Linguistic Constraints: Applications to Speech Recognition", Journal of the Acoustic Society of America, vol. 111, No. 2, Feb. 2002, pp. 1086-1101, 65 pages.

Mohammadi et al. "An overview of voice conversion systems", ScienceDirect, Speech Communication, Center for Spoken Language Understanding, Oregon Health & Science University, Portland, OR, Nov. 22, 2015, 18 pages.

* cited by examiner

PHONOLOGICAL CLUSTERING

BACKGROUND

The present invention generally relates to computing devices and, more particularly, to methods and systems for phonological clustering.

The basic building block of phonological structure is the phoneme. A phoneme is a unit of sound in speech. A phoneme does not have any inherent meaning by itself, but when phonemes are put together, they can make words. For example, when adults try to get a baby to say his or her first word, they often coax him or her to sound out the beginning of a word by repeating that sound, or phoneme, over and over, saying something like, "m, m, m" for "mommy." The "m" sound, often written as /m/, is an example of a phoneme.

Sounds (phonemes) may be classified into categories. The value of classifying phonemes into categories is improved speech recognition, among other applications. Phoneme categorization often includes treatment of phonemes as morphemes, by the implicit association of semantics. A morpheme is a short segment of language that meets three basic criteria: (1) it is a word or a part of a word that has meaning, (2) it cannot be divided into smaller meaningful segments without changing its meaning or leaving a meaningless remainder, and (3) it has relatively the same stable meaning in different verbal environments.

SUMMARY

In a first aspect of the invention, there is a method that includes: segmenting, by a computing device, a sentence into a plurality of tokens; determining, by the computing device, a plurality of phoneme variants corresponding to the plurality of tokens; clustering, by the computing device, the plurality of phoneme variants; creating, by the computing device, an initial vectorization of the plurality of phoneme variants based on the clustering; embedding, by the computing device, the initial vectorization of the plurality of phoneme variants into a deep learning model; and determining, by the computing device, a radial set of phoneme variants using the deep learning model.

In another aspect of the invention, there is a computer program product that includes a computer readable storage medium having program instructions embodied therewith. The program instructions are executable by a computing device to cause the computing device to: cluster a plurality of phoneme variants based upon associated phonemes; create an initial vectorization of the plurality of phoneme variants based on the clustering; embed the initial vectorization of the plurality of phoneme variants into a deep learning model; and determine a radial set of phoneme variants using the deep learning model.

In another aspect of the invention, there is a system that includes: a hardware processor, a computer readable memory, and a computer readable storage medium associated with a computing device; program instructions configured to segment a sentence into a plurality of tokens; program instructions configured to determine a plurality of phoneme variants corresponding to the plurality of tokens; program instructions configured to cluster the plurality of phoneme variants; program instructions configured to create an initial vectorization of the plurality of phoneme variants based on the clustering; program instructions configured to embed the initial vectorization of the plurality of phoneme variants into a deep learning model; and program instructions configured to determine a radial set of phoneme variants using the deep learning model, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
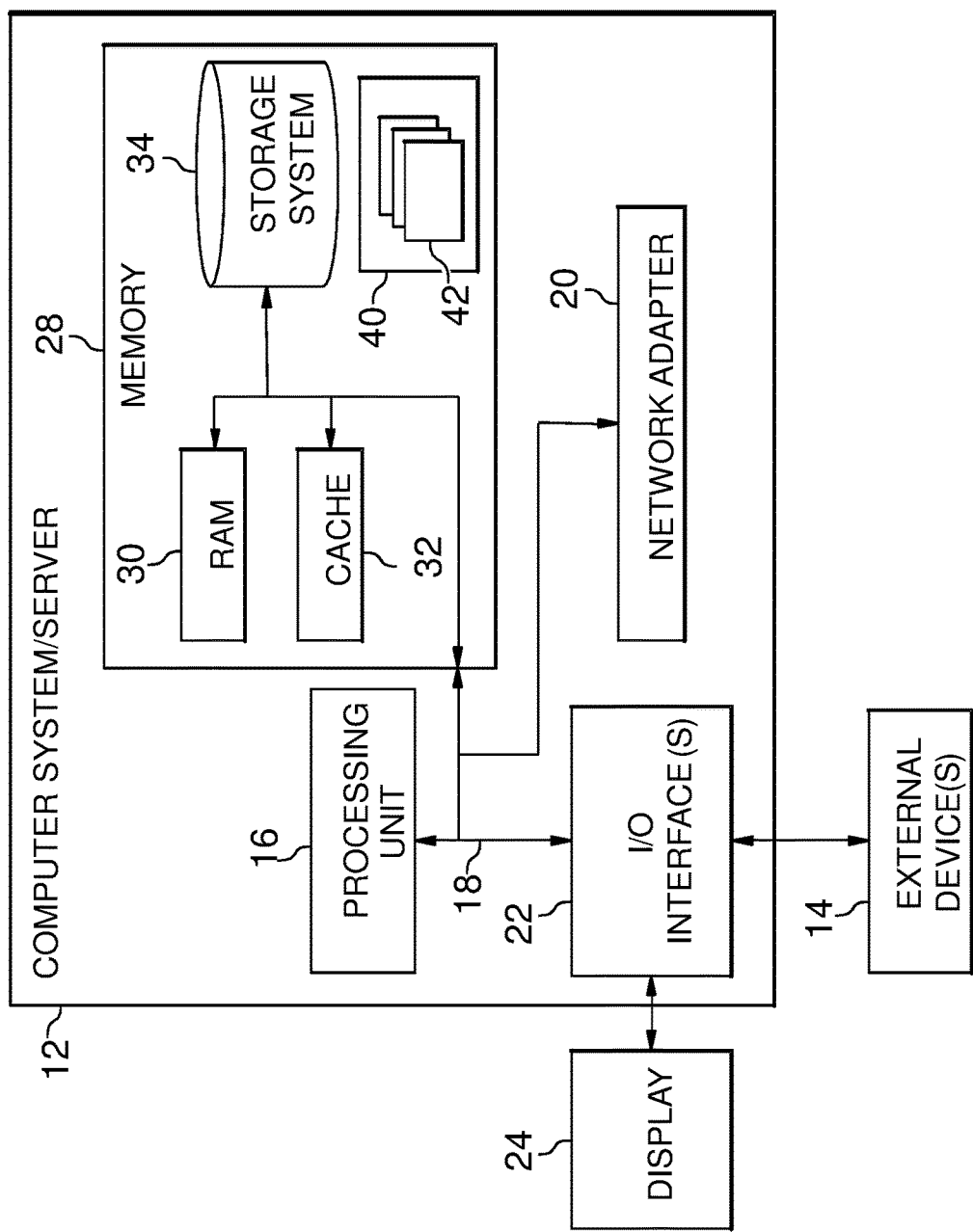
FIG. 1 depicts a computer system in accordance with aspects of the invention.

The present invention generally relates to computing devices and, more particularly, to methods and systems for phonological clustering. As described herein, aspects of the invention include a method and system for learning the proper categorization for phonemes. Embodiments achieve semi-automated creation of a non-semantic model that allows overlapping categorization of phonemes by clustering phonemes that can be automatically fit into a radial set without manual intervention. A repository of sounds that is thereby created that may be used by a text-to-speech system based on different inputs, such as a desired geographic-specific pronunciation of words.

Conventional methods in the linguistic field for categorizing phonemes suffer from two primary drawbacks. First, the majority of conventional categorization methods treat phonemes as implicit morphemes, through the assignment of meaning via categorization. However, phonemes do not have semantics (inherent meaning) but rather are just sounds. On the other hand, sounds associated with semantics are morphemes, and morphemes constitute an entirely different grammatical structure. Most frequently, the categories that phonemes are mapped into will not correspond with semantic structure (e.g., meaning). Accordingly, these conventional categorization methods that treat phonemes as implicit morphemes are suboptimal in their ability to categorize phonemes. Second, the conventional categorization methods that perform non-semantic categorization of phonemes are manual processes which are therefore done infrequently.

As described herein, aspects of the invention include a method and system for phonological clustering by generating an initial feature set including all possible phonemes in the categorization, achieving an initial vectorization of the phonemes by assigning contiguous numbering on phonetic symbols, training the model to embed the phonemes into a continuous vector, and outputting clustered phonemes that can be automatically fit into a radial set without the need for manual intervention.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
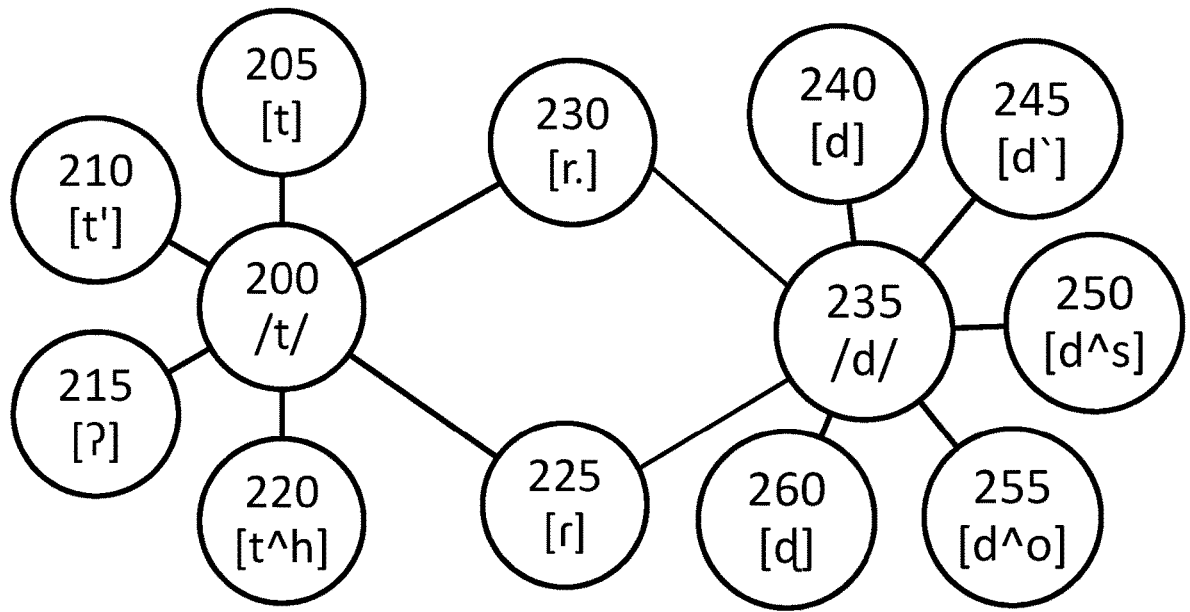
FIG. 2 depicts phoneme variants associated with the /t/ and /d/ phonemes, according to an example.

As illustrated in FIG. 2, there are at least six different variants (i.e., allophones) of the /t/ phoneme 200 in American English: (1) [t] 205 as in "stall", (2) [tʼ] 210 as in "What!", (3) [ʔ] 215 as in "button", (4) [tʰ] 220 as in "tall", (5) [ɾ] 225 as in "water", and (6) [r.] 230. One complexity of categorization is that native speakers do not normally notice the differences these phoneme variations constitute; and even in a formal phonetics class, it may take students several months to become aware that these variations exist at all. Though there is no single feature that all these sounds (phoneme variants) 205, 210, 215, 220, 225, 230 share, they are all still intrinsically categorized by native speakers as "kinds of /t/".

Still referring to FIG. 2, in the case of the phoneme /d/ 235, variants include: (1) [d] 240, (2) [dˋ] 245, (3) [dˆs] 250, (4) [dˆo] 255, (5) [d̪] 260, (6) [ɾ] 225, and (7) [r.] 230. Accordingly, at times, the /d/ phoneme 235 is pronounced in exactly the same way as the /t/ phoneme 200, for example, as [ɾ] 225 and as [r.] 230. For example, the word "butter" can have a "t-sound" that is pronounced like a "d-sound," that is, as [ɾ] 225. Likewise, the "d-sound" in the words "validity," "rider," and "grading" is pronounced the same as a "t-sound," that is, as [ɾ] 225. Accordingly, any attempt to categorize phoneme variants into a single category will therefore fail as certain sounds (e.g., phoneme variants [ɾ] 225 and [r.] 230) correspond to multiple phonemes (e.g., /t/ 200 and /d/ 235) and therefore are in overlapping categories. In other words, two distinct phonemes may have one or more allophones in common, along with other unique (i.e., non-shared) allophones.

While a "t-sound" may occasionally sound like a "d-sound," no native speaker would ever say that "t-sounds" and "d-sounds" are the same. Conventional phoneme theory does not permit the possibility of overlapping phonemes (e.g., two or more phonemes that share at least one allophone), but this is due to a shortcoming in the conventional model. Furthermore, according to a common conventional constrained semantic model, it is not possible for phonemes to belong to two or more categories at the same time. But again, this is a shortcoming in the conventional model rather than a real-world constraint.

Embodiments improve the functioning of a computer by providing for the semi-automated creation of a non-semantic model that allows overlapping categorization of phonemes (e.g., two or more phonemes that share at least one allophone). In particular, embodiments cluster phonemes and automatically fit the phonemes into a radial set data structure without manual intervention, thereby generating a repository of sounds. Embodiments also improve the functioning of a computer by using the generated repository of sounds for a computer text-to-speech system based on different inputs, such as a desired geographic-specific pronunciation of words. For example, a text-to-speech system may use the generated repository of sounds to improve speech generation by a computer by generating a more natural sound (e.g., customized to a particular geographic location or dialect such that the sound is natural to a listener). The generated repository of sounds may also improve the functioning of a computer by improving computer speech recognition. Additionally, the system uses techniques that are, by definition, rooted in computer technology (e.g., computer text-to-speech, computer speech recognition, and a deep learning model which uses a feedforward architecture for a neural network) that cannot be performed manually by a person.

Figure 3:
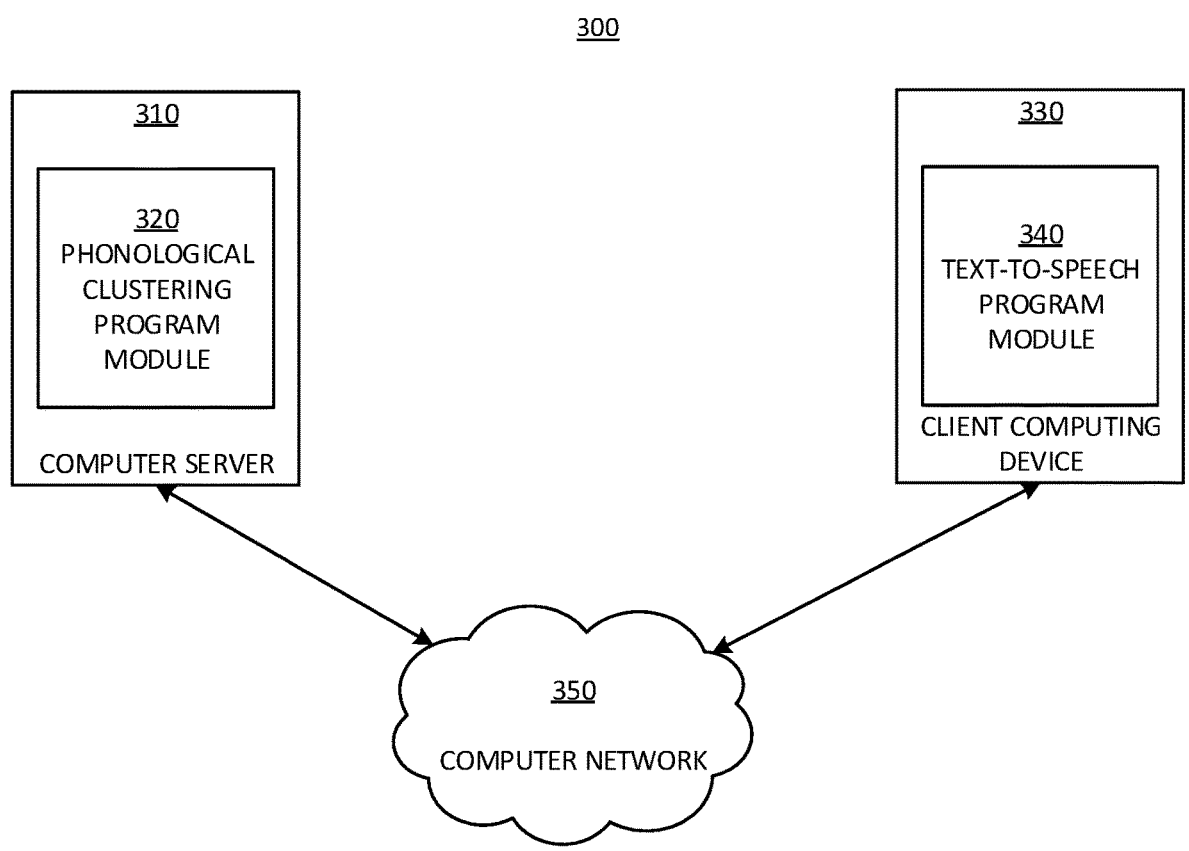
FIG. 3 depicts an illustrative environment in accordance with aspects of the invention.

FIG. 3 depicts an illustrative environment 300 in accordance with aspects of the invention. As shown, the environment 300 comprises a computer server 310 which is in communication with a client computing device 330 via a computer network 350. The computer network 350 may be any suitable network such as a LAN, WAN, or the Internet. The computer server 310 and the client computing device 330 may be physically collocated, or may be situated in separate physical locations.

The quantity of devices and/or networks in the environment 300 is not limited to what is shown in FIG. 3. In practice, the environment 300 may include additional devices and/or networks; fewer devices and/or networks; different devices and/or networks; or differently arranged devices and/or networks than illustrated in FIG. 3. Also, in some implementations, one or more of the devices of the environment 300 may perform one or more functions described as being performed by another one or more of the devices of the environment 300.

In embodiments, the computer server 310 may be a computer server 12 as shown in FIG. 1. The computer server 310 may be implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 310 may include a phonological clustering program module 320, which may include hardware and/or software and may be one or more of the program modules 42 shown in FIG. 1. According to an embodiment, the phonological clustering program module 320 includes program instructions for semi-automated creation of a non-semantic model that allows overlapping categorization of phonemes by clustering phonemes that can be automatically fit into a radial set without manual intervention. The program instructions included in the phonological clustering program module 320 of the computer server 310 may be executed by one or more hardware processors.

Still referring to FIG. 3, in embodiments, the client computing device 330 may be a computer system 12 as shown in FIG. 1. The client computing device 330 may be a desktop computer, a laptop computer, a mobile device such as a cellular phone, a tablet, or a PDA, or any other type of computing device. In embodiments, the client computing device 330 may include a text-to-speech program module 340, which may include hardware and/or software and may be one or more of the program modules 42 shown in FIG. 1. According to an embodiment, the text-to-speech program module 340 includes program instructions for generating computer speech from text and using a repository of sounds generated by the phonological clustering program module 320. The program instructions included in the text-to-speech program module 340 of the client computing device 330 may be executed by one or more hardware processors. In another embodiment, the text-to-speech program module 340 may be included in the computer server 310, rather than in the client computing device 330. In this embodiment, the computer server 310 may transmit speech generated by the text-to-speech program module 340 to the client computing device 330.

Figure 4:
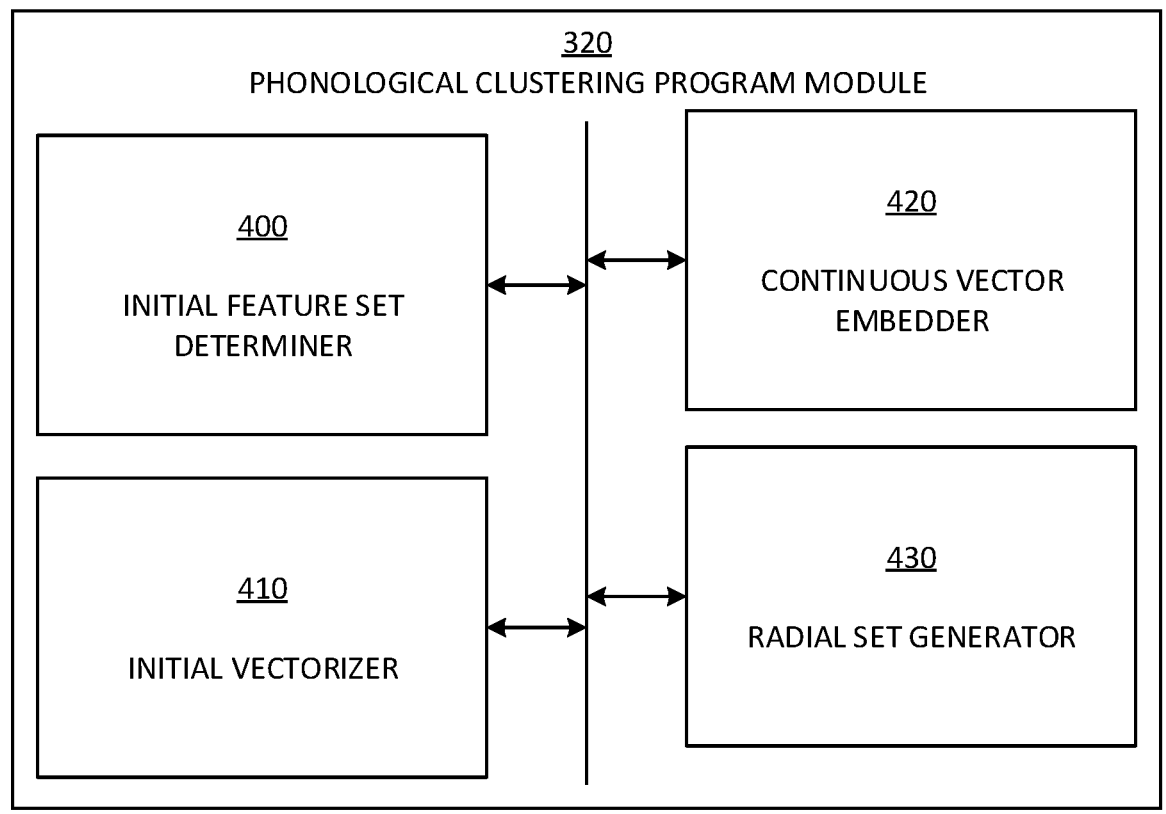
FIG. 4 depicts a block diagram of an exemplary program module in accordance with aspects of the invention.

FIG. 4 depicts a block diagram of an exemplary phonological clustering program module 320 in the computer server 310 (of FIG. 3) in accordance with aspects of the invention. In embodiments, the phonological clustering program module 320 includes an initial feature set determiner 400, an initial vectorizer 410, a continuous vector embedder 420, and a radial set generator 430, each of which may comprise one or more program modules 42 as described with respect to FIG. 1. In embodiments, the phonological clustering program module 320 may include additional or fewer components than those shown in FIG. 4. In embodiments, separate components may be integrated into a single computing component or module. Additionally, or alternatively, a single component may be implemented as multiple computing components or modules.

In embodiments, in response to the phonological clustering program module 320 receiving a request to perform phonological clustering (e.g., from a user or from another program module such as the text-to-speech program module 340), the phonological clustering program module 320 causes the initial feature set determiner 400 to determine all of the possible phoneme variants in the categorization that are being considered for the model and then generate an initial feature set comprising the phoneme variants that are being considered for the model. In particular, the initial feature set determiner 400 may receive a sentence, segment the sentence into tokens, and determine phoneme variants for each token, which are then used as the initial feature set. For example, the initial feature set determiner 400 may determine the initial feature set as comprising the phoneme variants [t] 205, [t'] 210, [2] 215, [tˆh] 220, [ɾ] 225, [r.] 230, [d] 240, [d`] 245, [dˆs] 250, [dˆo] 255, and [ɖ] 260 (of FIG. 2).

Still referring to FIG. 4, in embodiments, the initial vectorizer 410 clusters the phoneme variants determined by the initial feature set determiner 400 (e.g., based upon associated phonemes) to achieve the initial vectorization for the model. The initial vectorizer 410 assigns contiguous numbers or other identification to each phoneme variant in the clusters. For example, the initial vectorizer 410 may assign the identification "x1" to [t] 205, "x2" to [t'] 210, "x3" to [?] 215, "x4" to [tʰ] 220, "x5" to [ɾ] 225, "x6" to [r.] 230, "x7" to [d] 240, "x8" to [d`] 245, "x9" to [dˆs] 250, "x10" to [dˆo] 255, and "x11" to [d̪] 260.

In embodiments, the continuous vector embedder 420 embeds the phoneme variants in the initial vectorization generated by the initial vectorizer 410 into a deep learning model which uses a feedforward architecture for a neural network. Well-curated inputs (e.g., "ground truth") are fed into the model as training data to enable the phoneme variants to be embedded into a continuous vector via machine learning techniques.

The ground truth used by the continuous vector embedder 420 in training the model may include a repository of audio (speech) and an accurate association of text with that audio. The ground truth used as training data to train the model may further include metadata associated with the audio, such as geography, demographics, or any other information associated with the audio. The continuous vector embedder 420 ideally uses a diverse set of ground truth inputs to train the model. For example, audio from a diverse array of geographic locations may be used by the continuous vector embedder 420.

The training data may be any repository of audio (speech) with associated speech-to-text data and metadata (e.g., location data). For example, call center recordings or mobile device recordings, text data obtained by performing a speech-to-text conversion, and associated location data may be used to train the model.

The training data may include multiple utterances of particular words. The continuous vector embedder 420 takes all of the utterances of each word in the training data and determines the phoneme variants for each word as well as the frequency with which each phoneme variant is used for each word in the audio (speech). In this manner, the continuous vector embedder generates vectors that represent a phoneme-variant topology indicating the frequency with which each phoneme variant is used for each word.

For example, the continuous vector embedder 420 may determine that, in a first utterance of the word "butter" in the training data, the /t/ phoneme 200 is the [ɾ] phoneme variant 225 (i.e., the "t-sound" is the same as a "d-sound"), and in a second utterance of the word "butter" in the training data, the /t/ phoneme 200 is the [?] phoneme variant 215 (i.e., a glottal stop). The continuous vector embedder 420 may use associated metadata in the training data to determine that the [ɾ] phoneme variant 225 is used by a speaker from a first geographic area, and the [?] phoneme variant 215 is used by a speaker from a second geographic area. In this manner, the continuous vector embedder 420 may associate pronunciations and phoneme variants with particular geographic areas.

Still referring to FIG. 4, in embodiments, the radial set generator 430 uses the continuous vectors generated by the continuous vector embedder 420 to generate a radial set. In particular, the radial set generator 430 obtains clustered phonemes using Formula 1, below, and then automatically fits the clustered phoneme variants into a radial set without the need for manual intervention.

$$a_j^l = \sigma\left(\sum_k w_{jk}^l a_k^{l-1} + b_j^l\right)$$

Formula 1

In Formula 1, above, a represents a phoneme variant from the training data, l represents a layer, j represents a feature, w represents a weight formed by lines and vertices in the training data and indicating a probability of a feature occurring, and b represents a bias term that is trained over time using machine learning techniques. The summation is then fit into a sigmoid distribution, which normalizes the summation into a range of 0 to 1.

The radial set generator 430 uses the output of Formula 1 to determine the phoneme variants that fit into a radial set. In particular, according to an embodiment, output values over 0.5 are considered activated, indicating that there is overlap between phoneme variants and associated phonemes (e.g., /d/ and /t/), and values under 0.5 are considered inactivated. In other embodiments, a different value may be used as a threshold level for activation/inactivation.

Embodiments may use the radial set generated by the radial set generator 430 to generate natural-sounding text-to-speech audio. For example, the text-to-speech program module 340 in the client computing device 330 may use the radial set generated by the radial set generator 430 in a text-to-speech process. For example, the text-to-speech program module may use determine a particular phoneme variant to use from the radial set (e.g., for the /t/ phoneme or the /d/ phoneme) based upon a target audience (e.g., based on geographic or demographic information associated with the target audience). The text-to-speech program module 340 may refer to the radial set generated by the radial set generator 430 to select several phoneme variants per word and dozens per sentence and therefore generate more authentic and natural-sounding speech.

Figure 5:
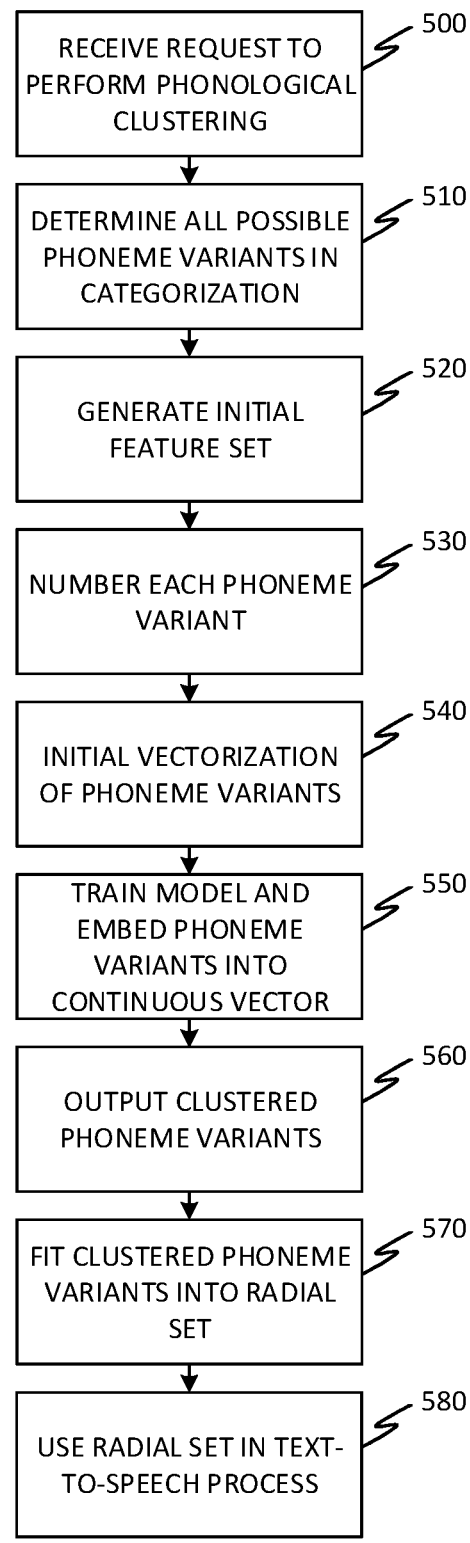
FIG. 5 depicts a flowchart of an exemplary method in accordance with aspects of the invention.

FIG. 5 depicts a flowchart of an exemplary method in accordance with aspects of the invention. The steps of the method may be performed in the environment of FIG. 3 and are described with reference to the elements and steps described with respect to FIGS. 1, 2, 3, and 4.

At step 500, the system receives a request to perform a phonological clustering. In embodiments, as described with respect to FIG. 4, step 500 comprises the phonological clustering program module 320 receiving the request from a user or from another program module or application, such as text-to-speech program module 340.

At step 510, the system determines all possible phoneme variants in the categorization. In embodiments, as described with respect to FIG. 4, step 510 comprises the initial feature set determiner 400 determining all of the possible phoneme variants in the categorization that are being considered for the model.

At step 520, the system generates an initial feature set. In embodiments, as described with respect to FIG. 4, step 520 comprises the initial feature set determiner 400 generating an initial feature set comprising the phoneme variants that are being considered for the model as determined at step 510.

At step 530, the system numbers each phoneme variant in the initial feature set. In embodiments, as described with respect to FIG. 4, step 530 comprises the initial vectorizer 410 assigning contiguous numbers or other identification to each phoneme variant in the initial feature set generated at step 520.

At step 540, the system generates the initial vectorization of the phoneme variants. In embodiments, as described with respect to FIG. 4, step 540 comprises the initial vectorizer 410 clustering the phoneme variants numbered at step 530.

At step 550, the system trains the model and embeds the phoneme variants into a continuous vector. In embodiments, as described with respect to FIG. 4, step 550 comprises the continuous vector embedder 420 using machine learning techniques including a feedforward architecture for a neural network to train the model and embed the phoneme variants into a continuous vector.

At step 560, the system outputs the clustered phoneme variants. In embodiments, as described with respect to FIG. 4, step 560 comprises the radial set generator 430 using the formula $a_j^l = \sigma(\Sigma_k w_{jk}^l a_k^{l-1} + b_j^l)$ to obtain clustered phoneme variants from the continuous vector generated at step 550.

At step 570, the system fits the clustered phoneme variants into a radial set. In embodiments, as described with respect to FIG. 4, step 570 comprises the radial set generator 430 fitting the clustered phoneme variants outputted at step 560 into a radial set.

At step 580, the system uses the radial set generated at step 570 in a text-to-speech process. In embodiments, as described with respect to FIGS. 3 and 4, step 580 comprises the text-to-speech program module 340 using the radial set generated by the radial set generator 430 in a text-to-speech process.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    segmenting, by a computing device, a sentence into a plurality of tokens;
    determining, by the computing device, a plurality of phoneme variants corresponding to the plurality of tokens;
    clustering, by the computing device, the plurality of phoneme variants;
    creating, by the computing device, an initial vectorization of the plurality of phoneme variants based on the clustering;
    embedding, by the computing device, the initial vectorization of the plurality of phoneme variants into a deep learning model; and
    determining, by the computing device, a radial set of phoneme variants using the deep learning model.

2. The method according to claim 1, further comprising using the radial set of phoneme variants in a text-to-speech process.

3. The method according to claim 2, wherein the text-to-speech process uses particular phoneme variants from the radial set based upon geographic or demographic information associated with a target audience.

4. The method according to claim 1, wherein the creating the initial vectorization comprises assigning contiguous numbers or other identification to each phoneme variant in a cluster.

5. The method according to claim 1, wherein the deep learning model uses a feedforward architecture for a neural network.

6. The method according to claim 1, wherein a repository of audio and corresponding text is input into the deep learning model as training data.

7. The method according to claim 6, wherein the training data further comprises metadata including geographic or demographic data associated with the audio.

8. A computer program product comprising a computer readable storage medium having program instructions embodied therewith, the program instructions executable by a computing device to cause the computing device to:
    cluster a plurality of phoneme variants based upon associated phonemes;
    create an initial vectorization of the plurality of phoneme variants based on the clustering;
    embed the initial vectorization of the plurality of phoneme variants into a deep learning model; and
    determine a radial set of phoneme variants using the deep learning model.

9. The computer program product according to claim 8, wherein the plurality of phoneme variants is determined by segmenting a sentence into a plurality of tokens and determining the plurality of phoneme variants corresponding to the plurality of tokens,
    wherein a first radial set of the phoneme variants are variants of a first phoneme of the phonemes,
    a second radial set of the phoneme variants are variants of a second phoneme of the phonemes,
    the first phoneme and the second phoneme are different phonemes, and
    at least one of the phoneme variants belongs to both the first radial set and the second radial set.

10. The computer program product according to claim 8, the program instructions further executable by the computing device to cause the computing device to use the radial set of phoneme variants in a text-to-speech process.

11. The computer program product according to claim 10, wherein the text-to-speech process uses particular phoneme variants from the radial set based upon geographic or demographic information associated with a target audience.

12. The computer program product according to claim 8, wherein the creating the initial vectorization comprises assigning contiguous numbers or other identification to each phoneme variant in a cluster.

13. The computer program product according to claim 8, wherein the deep learning model uses a feedforward architecture for a neural network.

14. The computer program product according to claim 8, wherein a repository of audio and corresponding text is input into the deep learning model as training data.

15. The computer program product according to claim 14, wherein the training data further comprises metadata including geographic or demographic data associated with the audio.

16. A system comprising:
   a hardware processor, a computer readable memory, and a computer readable storage medium associated with a computing device;
   program instructions configured to segment a sentence into a plurality of tokens;
   program instructions configured to determine a plurality of phoneme variants corresponding to the plurality of tokens;
   program instructions configured to cluster the plurality of phoneme variants;
   program instructions configured to create an initial vectorization of the plurality of phoneme variants based on the clustering;
   program instructions configured to embed the initial vectorization of the plurality of phoneme variants into a deep learning model; and
   program instructions configured to determine a plurality of radial sets of phoneme variants using the deep learning model, each of the plurality of radial sets comprising a distinct phoneme,
   wherein the program instructions are stored on the computer readable storage medium for execution by the hardware processor via the computer readable memory.

17. The system according to claim 16, further comprising program instructions configured to use the radial set of phoneme variants in a text-to-speech process.

18. The system according to claim 17, wherein the text-to-speech process is configured to use particular phoneme variants from the radial set based upon geographic or demographic information associated with a target audience.

19. The system according to claim 16, wherein the deep learning model uses a feedforward architecture for a neural network.

20. The system according to claim 16, wherein a repository of audio and corresponding text is input into the deep learning model as training data.

* * * * *